United States Patent
Langer et al.

(10) Patent No.: US 8,206,228 B2
(45) Date of Patent: Jun. 26, 2012

(54) MULTI-PART LONGITUDINAL SHAFT FOR MOTOR VEHICLES

(75) Inventors: Gerald Langer, Buelstringen (DE); Sebastian Frost, Bindfelde (DE)

(73) Assignee: IFA-Technologies GmbH, Haldensleben (DE)

( * ) Notice: Subject to any disclaimer, the term of this patent is extended or adjusted under 35 U.S.C. 154(b) by 282 days.

(21) Appl. No.: 12/592,092

(22) Filed: Nov. 19, 2009

(65) Prior Publication Data

US 2010/0130292 A1 May 27, 2010

(30) Foreign Application Priority Data

Nov. 21, 2008 (DE) .................. 10 2008 058 476

(51) Int. Cl.
*F16D 3/84* (2006.01)
(52) U.S. Cl. ...................... 464/173; 464/906
(58) Field of Classification Search .................. 464/146, 464/162, 167, 173, 905, 906
See application file for complete search history.

(56) References Cited

U.S. PATENT DOCUMENTS

| 2,354,961 | A  | * | 8/1944 | O'Donnell |
| 6,379,255 | B1 |   | 4/2002 | Cermak et al. |
| 7,226,360 | B2 | * | 6/2007 | Lyon et al. ............. 464/146 |
| 2007/0105461 | A1 |   | 5/2007 | Lyon et al. |

FOREIGN PATENT DOCUMENTS

| DE | 199 43 880 C1 | 6/2001 |
| DE | 10 2005 029 754 B4 | 12/2006 |
| DE | 10 2007 015 074 | 7/2008 |

* cited by examiner

*Primary Examiner* — Gregory Binda
(74) *Attorney, Agent, or Firm* — Collard & Roe, P.C.

(57) ABSTRACT

A multi-part longitudinal drive shaft of a motor vehicle consists of two shaft sections that are each formed by a shaft tube connected with each other by a homokinetic displacement joint. The outer diameter of the shaft tube in the second shaft section is smaller than the inner diameter of the shaft tube of the first section. The outer joint ring of the homokinetic displacement joint is firmly connected with the shaft tube of the first shaft section and a ball hub of the joint is connected with the second shaft section. When a specific axial position is exceeded, the homokinetic displacement joint can be broken down. The individual parts of the two shaft sections can be displaced into one another, after break-down of the homokinetic displacement joint, so that the second shaft section is displaced in the direction of the first shaft section.

1 Claim, 4 Drawing Sheets

MULTI-PART LONGITUDINAL SHAFT FOR MOTOR VEHICLES

CROSS REFERENCE TO RELATED APPLICATIONS

Applicants claim priority under 35 U.S.C. §119 of German Application No. 10 2008 058 476.2 filed Nov. 21, 2008.

BACKGROUND OF THE INVENTION

1. Field of the Invention

The invention relates to a multi-part longitudinal shaft for motor vehicles, for transfer of a torque, particularly for the drive train of a motor vehicle. The shaft consists of two or more shaft sections and one rotary joint that connects the two shaft sections. The joint can be a homokinetic joint.

2. The Prior Art

Such longitudinal drive shafts are generally known and serve to transfer torque and are configured in such a manner that in the event of a crash, i.e. a frontal impact accident or a crash in the longitudinal direction of the vehicle, the longitudinal drive shaft is shortened in the axial direction, in order to avoid bending and penetration into the interior of the motor vehicle. This precludes injuries to the persons situated in the passenger space, to the greatest possible extent.

For example, in German Patent No. DE 199 43 880 C1, a longitudinal drive shaft having two shaft sections is described, which sections are connected with one another by way of a homokinetic rotary joint. The homokinetic rotary joint comprises an inner joint part that is connected with one of the two shaft sections, so as to rotate with it. The outer joint part is connected with the other of the two shaft sections, so as to rotate with it, and balls held in a cage serve to transfer torque between the inner joint part and the outer joint part.

The diameter ratios of the two shaft sections are selected in such a way that after destruction of the homokinetic rotary joint, in the event of a crash, the two shaft sections are supposed to move into one another, in telescoping manner, and essentially without force, if the displacement path of the homokinetic rotary joint that is maximally permissible in the axial direction is exceeded.

Displacement of the parts into one another is reliably guaranteed by the different dimensioning of the functional parts of the drive array in question, in order for them to telescope relative to one another. However, a significant force is required to initiate this process of telescoping, and there is no guarantee that the longitudinal drive shaft will not bend.

German Patent No. DE 10 2005 029 754 B4 describes a multi-part longitudinal shaft for the drive train of a motor vehicle, which consists of two shaft sections that are connected with one another by way of a rotary joint. The shaft sections are configured with different diameters, so that these shaft sections can be pushed into one another. In the first shaft section, a protective element is disposed, which accommodates the inner joint part at least in part, after the rotary joint is broken down, and is supposed to guide it into the first shaft section. The protective element has an attachment section for support relative to the first shaft section, and an accommodation section for accommodating the inner joint part. In addition, a planned breaking point is provided in the accommodation section.

Another longitudinal drive shaft for motor vehicles, which consists of two or more shaft sections that are connected with one another by way of an intermediate shaft or a journal, are described in German Patent Application No. DE 10 2007 015 074 A1.

The intermediate shaft or the journal is the carrier of a center bearing. In the direction toward the first shaft section, the intermediate shaft or the journal are connected by way of a joint that is fixed in the tube, and the parts that are displaced in the event of a crash, are configured in such a manner that these can also be pushed into one another and guided in one another.

The joint that is provided in the case of this longitudinal drive shaft is configured as a homokinetic displacement joint that consists of an outer joint ring, a ball hub, balls that are disposed to move in ball grooves leading from the outer joint ring and the ball hub, as well as a cage. The homokinetic displacement joint is sealed, in the direction of the one shaft section, with a sealing cap and sealing bellows. A closure lid configured as a guide and securing element is assigned to the homokinetic displacement joint relative to the other shaft section and projects into the interior of the tube, which element is configured with planned breakage points.

The solutions that are presented reliably guarantee telescoping of the functional parts of the longitudinal drive shaft in the event of a crash, but even in these solutions, there is the risk that under certain circumstances, the shaft sections will not telescope into one another completely. Thus, there is the risk that the outer shaft tube will tear open, as the result of penetration of the other shaft tube, due to bending moments that occur, and thus the longitudinal drive shaft is only pushed partly into itself.

SUMMARY OF THE INVENTION

Taking into account the disadvantages of the known solutions, it is an object of the invention to further develop a multi-part longitudinal drive shaft for motor vehicles, for transfer of a torque, particularly for the drive train of a motor vehicle, in such a manner that in the event of a crash, the individual function-determining components of the longitudinal drive shaft are displaceable into one another, and uncontrolled bending of the shaft sections of the longitudinal drive shaft is avoided.

This task is accomplished, according to the invention, by a multi-part longitudinal drive shaft for transferring torques in the drive train of a motor vehicle that consists of two shaft sections that are each formed by a shaft tube, whose diameters, relative to one another, are coordinated in such a manner that the outer diameter of the second shaft section is smaller than the inner diameter of the shaft tube of the first shaft section.

Furthermore, a rotary joint, preferably a homokinetic displacement joint, by means of which the two shaft sections are connected with one another, belongs to the longitudinal drive shaft presented.

The connection between the first shaft section and the homokinetic rotary joint takes place by way of the outer joint ring of the homokinetic displacement joint, which is firmly connected with the shaft tube of the first shaft section. The connection of the homokinetic displacement joint to the second shaft section takes place by way of a shaft journal that is firmly connected with the ball hub of the homokinetic displacement joint, on the one hand, and firmly connected with the shaft tube of the second shaft section, on the other hand. An intermediate bearing that is provided serves for supporting and guiding the shaft journal.

The homokinetic displacement joint is configured in known manner; it consists of the outer joint ring and the ball hub, which has ball grooves in which the balls are disposed and are guided in a cage provided between the outer joint ring and the ball hub.

In the present case, the homokinetic displacement joint is configured in such a manner that when a specific axial position is exceeded, it can be broken down. Thus, the individual parts of the two shaft sections are accommodated, without damage, in that the first and the second shaft section can be displaced into one another, after break-down of the homokinetic displacement joint because of axial forces that occur, in such a manner that the second shaft section is displaced in the direction of the first shaft section.

The intermediate bearing and the roller bearing disposed in it are dimensioned, in terms of their outer dimensions, and configured in such a manner that in the case of a frontal impact, a crash, parts of the roller bearing can also telescope into the interior of the first shaft section, and thus it is ensured, to the greatest possible extent, that the entire longitudinal drive shaft and even individual parts of it can no longer bend out.

In the case of the solution according to the invention, the homokinetic displacement joint provided is sealed, by means of two seal arrangements, both with regard to the first shaft section and the second shaft section, and thus also toward the outside, so that for one thing, contamination of the homokinetic displacement joint is precluded, and, on the other hand, exit of grease from the joint is avoided.

It is essential for the solution presented that the seal arrangements provided serve not only for the protective and sealing functions, but also as functional elements in the event of a crash. The seal arrangements are each configured and dimensioned in such a way that a displacement path limitation is implemented.

Thus, according to the invention, one seal arrangement consists of an air bellows and the other seal arrangement consists of an elastomer bellows. This elastomer bellows is disposed in the interior of the shaft tube of the first shaft section, and the air bellows is provided between the homokinetic displacement joint and the second shaft section. The air bellows is firmly connected with the outer joint ring of the homokinetic displacement joint and with the shaft journal, by way of a clamping ring, so that a function-related connection with the second shaft section exists. This way, the air bellows also fulfills its sealing function and corresponds, in terms of its configuration and formation, to known air bellows. However, this air bellows also serves as a path limitation, which is stretched in the axial direction, at a maximal displacement path, until the break-off force is reached with a further increase in the crash force, so that the air bellows can no longer be displaced, i.e. stretched, the planned breaking range has been reached, and as a result, the air bellows breaks down and telescoping of the second shaft section is made possible.

The elastomer bellows disposed in the other shaft tube also fulfills not only its sealing function, but also the protective function, in such a manner that controlled displacement of the parts into one another, i.e., telescoping of parts of the second shaft section into the interior of the first section, is made possible.

This is implemented by the configuration and embodiment of the elastomer bellows, whose elastomer element consists of an elastomer or can be produced from a similar elastic material. Thus, this elastomer element can consist of a similar plastic or also of a rubber material, which correspond to the properties of an elastomer, and thus impart elasticity and also the required stiffness to the elastomer.

In this connection, it is particularly advantageous that the elastomer bellows, as a whole, acts essentially as a planned breaking point for the homokinetic displacement joint, and thus for the longitudinal drive shaft.

According to the solution presented, the elastomer element is bound into an accommodation and attachment part, which is disposed in the interior of the shaft tube of the first shaft section.

In its totality, the elastomer bellows, with its accommodation and attachment part, is configured in the manner of a lid, to the greatest possible extent, and the circular surface part of the elastomer bellows, i.e., the elastomer element, serves as a support surface for the shaft journal, which is displaced in the event of a crash, and for the ball hub of the homokinetic displacement joint. The elastomer bellows is firmly connected with the interior of the shaft tube by way of its accommodation and attachment part, for example by means of a press fit.

Furthermore, the accommodation and attachment part of the elastomer bellows consists of a component configured in a ring shape, which is configured with a projection in which a groove is provided on the circumference. The accommodation and attachment part is connected with the inner wall of the shaft tube, by way of its outer collar, and the elastomer element is attached to the accommodation and attachment part. The accommodation and attachment part is the support element for the elastomer element and the functional part for the connection to the shaft tube.

In one embodiment, this support element is configured as a ring-shaped base body, which is attached to the interior of the shaft tube, by way of its outer circumference, and has a circumferential groove in its inner bore, in which the elastomer element is inserted and braced.

The accommodation/attachment units, i.e., the support elements, are configured as a rotational turning part, or, in a preferred embodiment, are structured as a sheet-metal part, whereby these support elements, whether they are configured as a turning part or as a sheet-metal part, possess the same structures and geometric dimensions, in order to be able to accommodate the elastomer element and in order to be able to be connected with the inner wall of the shaft tube.

Functional advantages during use of a longitudinal drive shaft configured in this manner result from the configuration and placement of the seal arrangements, which advantages are due to the fact that a displacement path limitation of the longitudinal drive shaft is implemented, with which it is assured that during installation and removal and during use of the longitudinal drive shaft, at low axial forces, the homokinetic displacement joint does not break down. In addition, it is guaranteed that in the event of a crash, the homokinetic displacement joint breaks down. This happens when axial forces, crash forces in the range of >0-10 KN, occur. The seal arrangements used thus fulfill functions of displacement path limitation and of planned breakage, which in turn are based on the formation of the air bellows and elastomer bellows and their placement, as well as their attachment to the accommodation and attachment part.

The elastomer bellows, because of the configuration of the elastomer element, brings about a certain equalization of air flows or of grease flows that can take place as the result of displacement movements, so that here, ventilation functions are also taken on. Thus, ventilation devices of the homokinetic displacement joint are not required. The elastomer bellows bulges out temporarily, and thus assures equalizing flow conditions within the homokinetic displacement joint.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
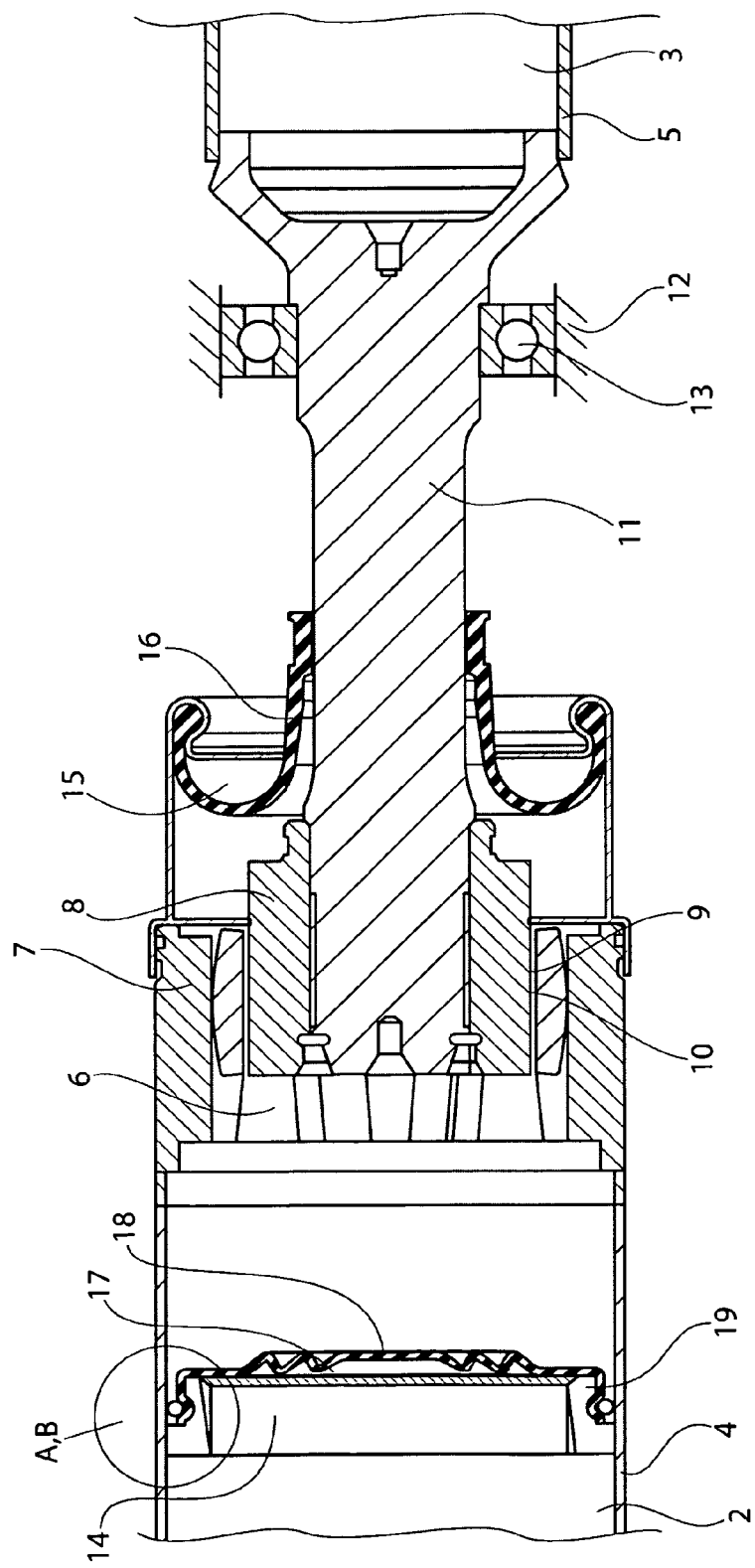
FIG. 1 shows the longitudinal drive shaft according to one embodiment of the invention in the normal operating state.

Referring now in detail to the drawings, a multi-part longitudinal drive shaft 1 is shown in its fundamental structure in FIG. 1. Longitudinal drive shaft 1 consists of two shaft sections, a first shaft section 2 and a second shaft section 3. Shaft sections 2, 3 possess shaft tubes 4, 5 and are connected with one another by way of a homokinetic displacement joint 6. Shaft tube 4 has a greater inside diameter than an outside diameter of shaft tube 5, so that parts of the second shaft section 3 can be telescoped relative to the first shaft section 2.

The connection of first shaft section 2 with homokinetic displacement joint 6 takes place by way of a firm connection, preferably a welded connection between shaft tube 4 and outer joint ring 7 of homokinetic displacement joint 6.

The connection between the homokinetic displacement joint 6 and second shaft section 3 takes place by way of a shaft journal 11, which is disposed in ball hub 8 of homokinetic displacement joint 6 and, on the other hand, is firmly connected with shaft tube 5 of second shaft section 3.

Sealing of homokinetic displacement joint 6 is implemented by way of seal arrangements 14; 15, for example an air bellows 16 and an elastomer bellows 17.

In this connection, air bellows 16 is provided between homokinetic displacement joint 6 and second shaft section 3, and is firmly connected both with homokinetic displacement joint 6 and with shaft journal 11. The firm connection of air bellows 16 takes place by bracing with outer joint ring 7 of homokinetic joint 6, and with shaft journal 11, by way of a clamping ring that is not shown in any detail, which braces air bellows 16 on its circumference, relative to shaft journal 11, and attaches it to the latter.

On the opposite side, at the connection between homokinetic displacement joint 6 and first shaft section 2, sealing of homokinetic displacement joint 6 takes place by way of seal arrangement 14, which is structured as an elastomer bellows 17.

Elastomer bellows 17 is inserted into the interior of shaft tube 4 of first shaft section 2, and firmly connected with it.

Elastomer bellows 17 itself consists of an elastomer element 18, an accommodation and attachment element 19 which forms a support element for the elastomer element 18. Elastomer element 18 is firmly connected with the accommodation and attachment part 19, preferably by way of a press fit, with the inner wall of shaft tube 4 of first shaft section 1.

It is furthermore evident from FIG. 1 that an intermediate bearing 12 is provided between first shaft section 2 and second shaft section 3, in which bearing shaft journal 11 is disposed to rotate by way of a roller bearing 13.

FIG. 1 thus shows the multi-part longitudinal drive shaft 1 in its basic position, or also called the starting position, if longitudinal drive shaft 1 is installed in a drive train of a motor vehicle and is not yet subject to any stress.

Figure 2:
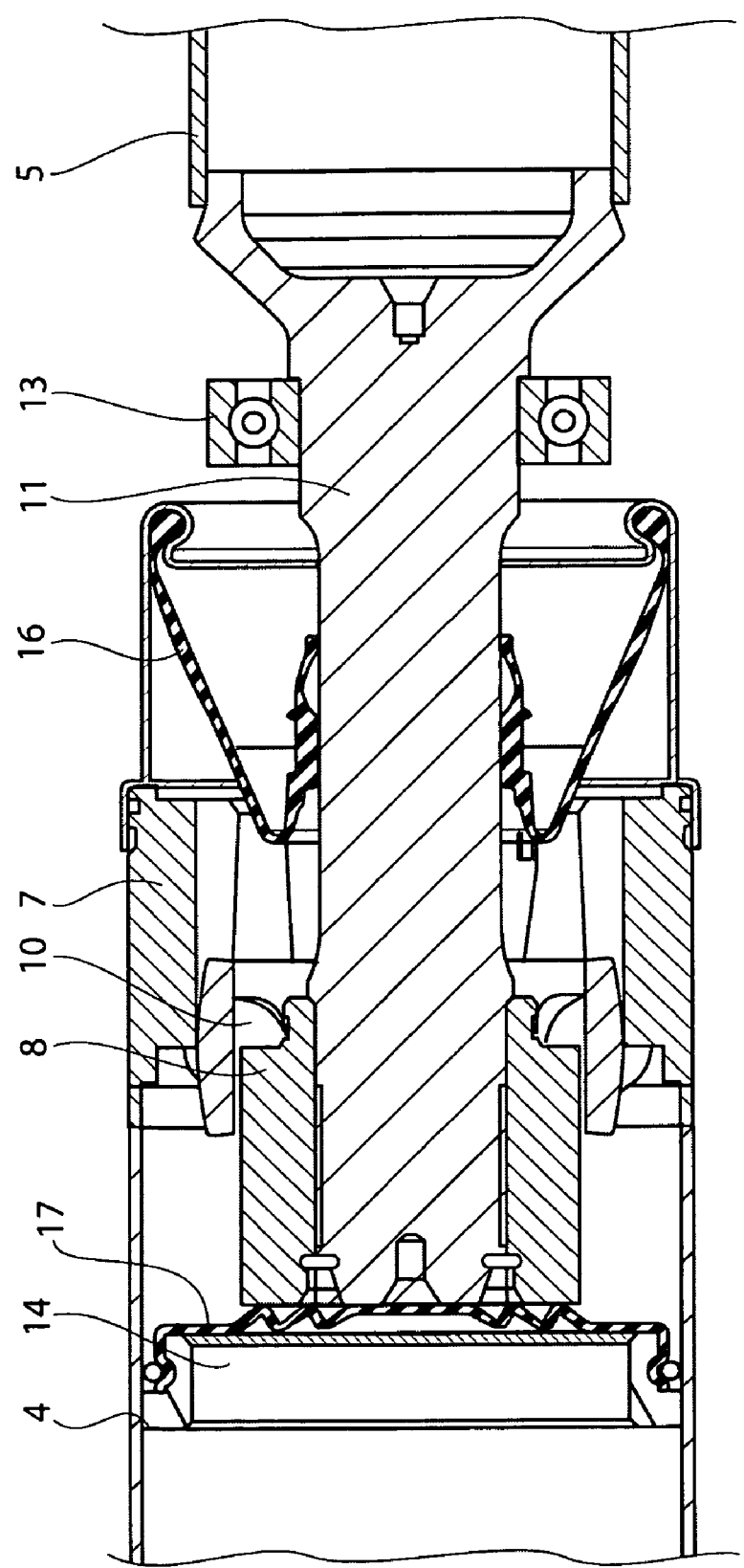
FIG. 2 shows the longitudinal drive shaft in an axially displaced position, a first stage of a crash.

A first position of the displacement of longitudinal drive shaft 1 is shown in FIG. 2; this is the position in which an axial force of shaft section 3 acts on homokinetic displacement joint 6 by way of shaft journal 11 and air bellows 16.

This position shown is a first stage of a possible frontal impact, in which the axial force that occurs has not yet brought about destruction of homokinetic displacement joint 6. This is the maximal displacement position of homokinetic displacement joint 6 in normal operation, without its destruction, i.e. a crash has not yet occurred. Restriction of the displacement takes place by means of air bellows 16.

This first displacement position of longitudinal drive shaft 1 according to FIG. 2 makes it clear that the axial force is acting on homokinetic displacement joint 6 from the right, and in this connection has displaced both air bellows 16 and ball hub 8 to the left, in the direction of elastomer bellows 17, without air bellows 16 and the homokinetic displacement joint being destroyed.

When this axial force of second shaft section 3 acts on air bellows 16 and on homokinetic displacement joint 6 by way of shaft journal 11, air bellows 16, which is firmly connected with outer joint ring 7 of homokinetic joint 6 and firmly connected with shaft journal 11, is tensed, stretched, and assumes the position shown in FIG. 2, and is not yet destroyed. Homokinetic displacement joint 6 is also not yet destroyed, and has still been maintained in its function, only ball hub 8 has been displaced to the left in the direction of elastomer bellows 17, as a result of the axially acting force, but the connection with outer joint ring 7 of homokinetic displacement joint 6 still exists, by way of balls 10, and the function of homokinetic displacement joint 6 and that of air bellows 16 have been maintained.

Figure 3:
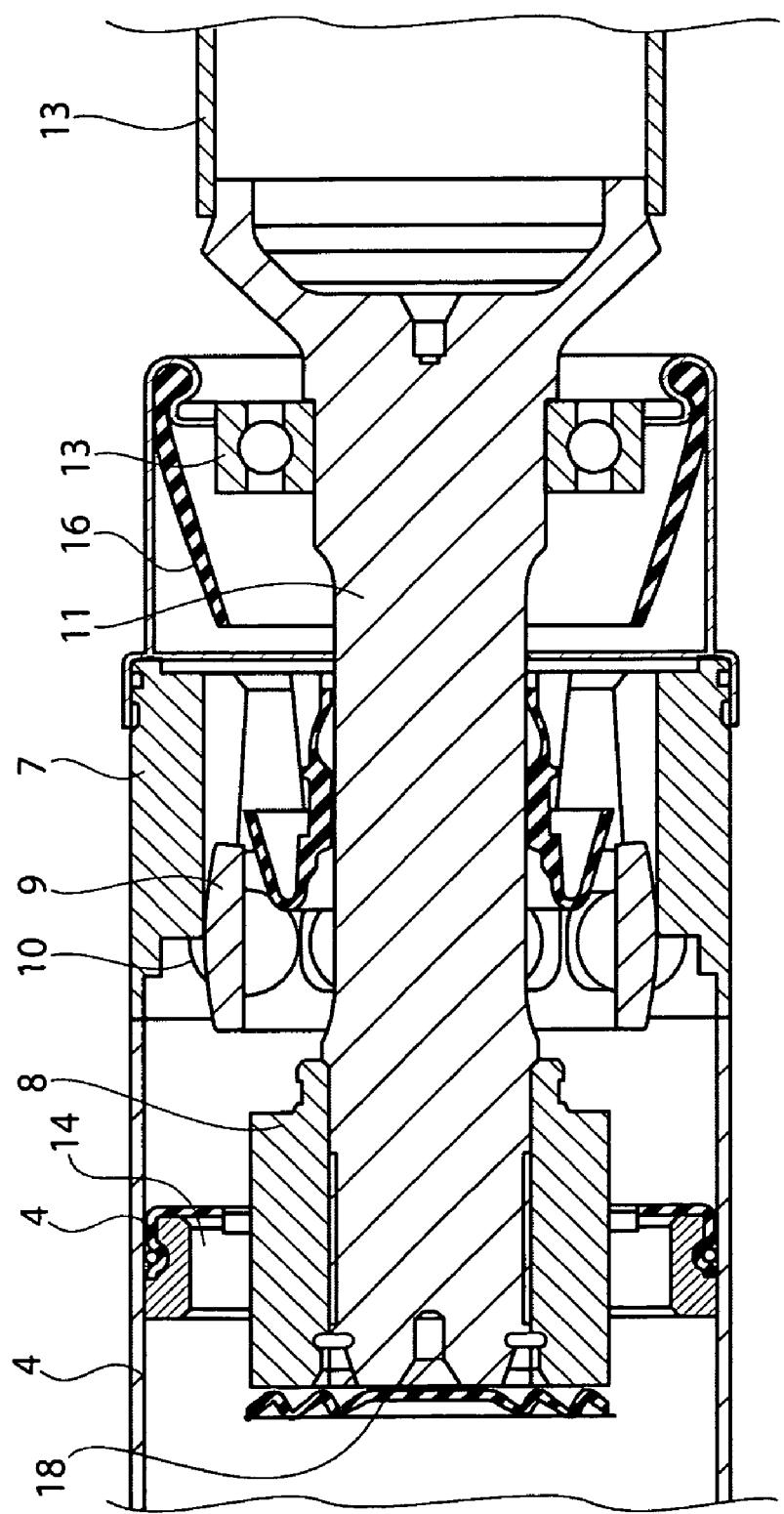
FIG. 3 shows the longitudinal drive shaft in a position in which it is axially displaced further, in a further stage of a crash.

At a greater axial force, i.e. in the case of a further axial force on air bellows 16 and homokinetic displacement joint 6, both air bellows 16 and homokinetic displacement joint 6 are destroyed, and shaft journal 11, with ball hub 8 fixed in place on it, are displaced farther to the left, in the direction of elastomer bellows 17, and come to lie against elastomer element 18 of elastomer bellows 17. If the force acts further axially, shaft journal 11 with ball hub 8 is displaced farther to the left, and when a specific axial force value is reached, elastomer bellows 17 is destroyed and thus free and force-free telescoping of second shaft section 3 into first shaft section 2 is possible, as shown in FIG. 3.

In this connection, air bellows 16 and elastomer bellows 17 are configured, in terms of their shape and the strength/stretching properties, in such a manner that they function as planned breaking points.

Figure 4:
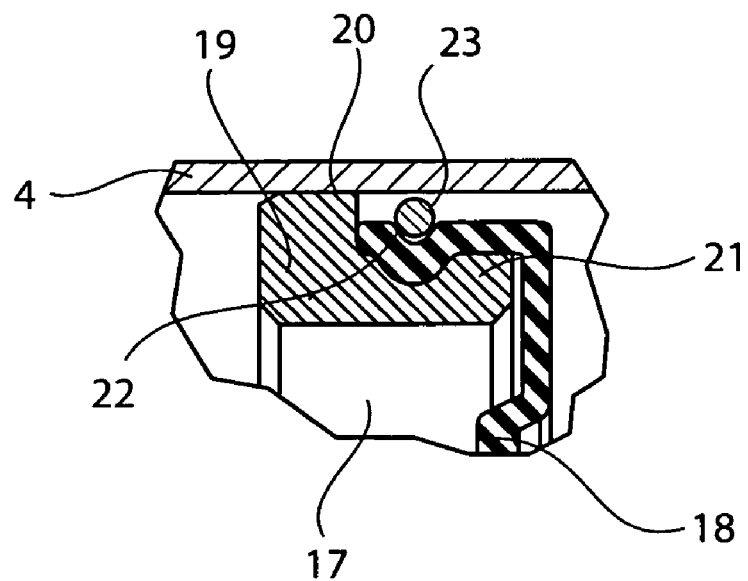
FIG. 4 shows an enlarged representation of the detail A according to FIG. 1, the configuration and placement of the elastomer element for the accommodation and attachment part.
Figure 5:
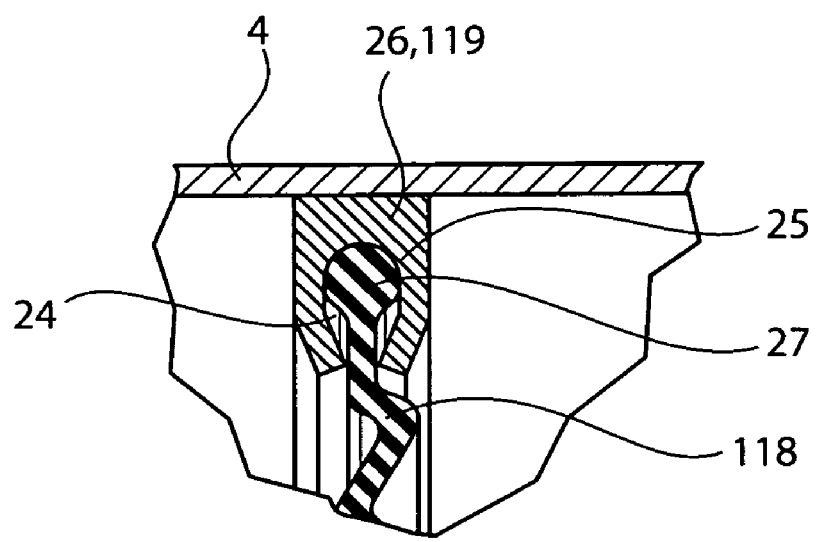
FIG. 5 shows an enlarged representation of the detail B according to FIG. 1, a further embodiment of the configuration and placement of the elastomer element for the accommodation and attachment part.

The configuration and placement of elastomer bellows 17 is shown in FIGS. 4 and 5, which reproduce enlarged representations of the details A, B of FIG. 1. Thus, according to FIG. 4, elastomer bellows 17 consists of accommodation and attachment part 19, which possesses an outer collar 20 and a projection 21. The accommodation and attachment part 19 is the support element of the elastomer element 18, which is attached to projection 21 of accommodation and attachment part 19. This takes place in such a manner that elastomer element 18 is laid onto projection 21 and clamped/braced on projection 21 by means of a securing ring 23. Projection 21 possesses a circumferential outer groove 22, so that elastomer element 18 is laid into this groove 22 and connected with accommodation and attachment part 19, in functionally reliable manner, by way of securing ring 23.

Elastomer bellows 17 is attached to the inner wall of shaft tube 4 of first shaft section 2 by way of outer collar 20. This connection is configured as a firm connection, preferably a press connection.

As is evident from FIGS. 1 to 5, elastomer element 18 of elastomer bellows 17 is configured in wave shape in its circular surface part, thereby increasing the size of the accommodation surface of elastomer element 18 and also its stretching properties, which has a positive effect in the event of a crash, and elastomer element 18 takes over certain slide functions for the parts that telescope into first shaft section 2, after it is destroyed.

In another embodiment, elastomer bellows 17 is configured, as shown in FIG. 5, as a ring body 26, which is connected with the inner wall of shaft tube 4 of first shaft section 2 by way of its outer collar; ring body 26 possesses a circumferential groove 24 in its inner bore, in which elastomer element 18 finds accommodation.

As also shown in FIG. 5, elastomer element 118 is configured with a circumferential bead 27 that corresponds to the shape of widened groove bottom 25 of groove 24, and thus a shape-fit connection between elastomer element 118 and accommodation and attachment part 119 exists, while the force-fit connection between these two parts takes place by way of bracing together the two front-side projections of groove 24 of ring body 26, for example by crimping the two projections of groove 24.

Accommodation and attachment parts 19, 119 of elastomer bellows 17, whether configured according to FIG. 4 or FIG. 5, can be configured both as a turning part or as a sheet-metal part, and independent of the configuration of the accommodation and attachment part 19, 119, elastomer elements 18, 118 are connected with accommodation and attachment parts 19, 119, in the manner described above.

Accordingly, while only a few embodiments of the present invention have been shown and described, it is obvious that many changes and modifications may be made thereunto without departing from the spirit and scope of the invention.

What is claimed is:

1. A multi-part longitudinal drive shaft for motor vehicles, for transfer of a torque, comprising:
   a first shaft section having a shaft tube;
   a second shaft section having a shaft tube, wherein the shaft tube of the first shaft section has a greater inside diameter than an outside diameter of the shaft tube of the second shaft section, so that parts of the second shaft section can be telescoped relative to the first shaft section;
   a homokinetic displacement joint connecting the first shaft section to the second shaft section, the homokinetic displacement joint adapted to be broken down by an axial force and comprising:
      an outer joint ring firmly connected with the first shaft section;
      a ball hub firmly connected with the second shaft section by way of a shaft journal inserted into the second shaft section, and
      seals for sealing the homokinetic displacement joint with regard to the first and second shaft sections, said seals comprising a closure lid in the form of an elastomer bellows disposed in the first shaft section, and an air bellows,
   wherein the elastomer bellows consists of an accommodation and attachment part structured as a support part, and of an elastomer element, the accommodation and attachment part being configured with an outer collar and a projection having a circumferential groove, and
   wherein the elastomer element possesses a circular center part configured in a wave shape and being disposed on the projection of the accommodation and attachment part.

* * * * *